United States Patent
Blanpain et al.

(10) Patent No.: US 9,488,306 B2
(45) Date of Patent: Nov. 8, 2016

(54) DEVICE FOR GUIDING AND HOLDING A CABLE WITHIN A PIPE

(75) Inventors: Thierry Blanpain, Conde sur Vesgre (FR); Dominique Chauvet, Velizy (FR)

(73) Assignee: MESSIER-BUGATTI-DOWTY, Velizy-Villacoublay (FR)

( * ) Notice: Subject to any disclaimer, the term of this patent is extended or adjusted under 35 U.S.C. 154(b) by 226 days.

(21) Appl. No.: 13/992,124

(22) PCT Filed: Dec. 15, 2011

(86) PCT No.: PCT/EP2011/072976
§ 371 (c)(1),
(2), (4) Date: Jun. 6, 2013

(87) PCT Pub. No.: WO2012/080426
PCT Pub. Date: Jun. 21, 2012

(65) Prior Publication Data
US 2013/0248041 A1    Sep. 26, 2013

(30) Foreign Application Priority Data

Dec. 16, 2010 (FR) ...................................... 10 60665

(51) Int. Cl.
| F16L 55/00 | (2006.01) |
| F16L 55/07 | (2006.01) |
| H02G 3/38 | (2006.01) |
| H02G 3/32 | (2006.01) |
| B64C 25/02 | (2006.01) |

(52) U.S. Cl.
CPC ................. *F16L 55/07* (2013.01); *H02G 3/28* (2013.01); *H02G 3/32* (2013.01); *B64C 25/02* (2013.01); *Y10T 29/49826* (2015.01)

(58) Field of Classification Search
CPC .................................. F16L 55/07; H02G 3/28
USPC .................................................. 138/108, 110
See application file for complete search history.

(56) References Cited

U.S. PATENT DOCUMENTS

| 3,349,168 A | * | 10/1967 | Rehder .................. H02G 5/066 138/108 |
| 4,250,927 A | | 2/1981 | Newburg |
| 4,413,733 A | * | 11/1983 | Dunn et al. .................... 206/446 |
| 5,018,260 A | | 5/1991 | Ziu |
| 5,197,518 A | * | 3/1993 | Ziu ............................... 138/113 |
| 5,862,834 A | * | 1/1999 | Ziu .......................... F16L 7/00 138/108 |
| 6,050,890 A | * | 4/2000 | Bayer .................. F04D 29/668 248/634 |
| 6,158,475 A | * | 12/2000 | Clemmer ....................... 138/112 |
| 6,926,257 B1 | | 8/2005 | Alcantara |
| 7,647,947 B1 | * | 1/2010 | Littlebrant ................ F16L 7/00 138/106 |
| 2012/0043112 A1 | | 2/2012 | Persson et al. |

FOREIGN PATENT DOCUMENTS

| EP | 0 399 123 A1 | 11/1990 |
| EP | 2 246 867 A1 | 11/2010 |
| FR | 2893695 A1 | 5/2007 |

OTHER PUBLICATIONS

FR 2893695 with Machine Translation.*
International Search Report for PCT/EP2011/072976, dated Mar. 15, 2012.

* cited by examiner

*Primary Examiner* — Paul R Durand
*Assistant Examiner* — Vishal Pancholi
(74) *Attorney, Agent, or Firm* — Sughrue Mion, PLLC

(57) ABSTRACT

The invention provides a device (2) for guiding a cable (8*a*, 8*b*) in a duct (4), the device (2) being characterized in that it comprises at least one guide tube (12) receiving the cable (8*a*, 8*b*) and at least one expandable clamp (13) secured to one end (12*a*) of the tube (12), the expandable clamp (13) being deployed so as to be blocked against the inside wall of the duct (4) in order to hold the tube (12) in the duct (4). The device serves to guide and hold the cable in the duct without damaging the duct.

5 Claims, 3 Drawing Sheets

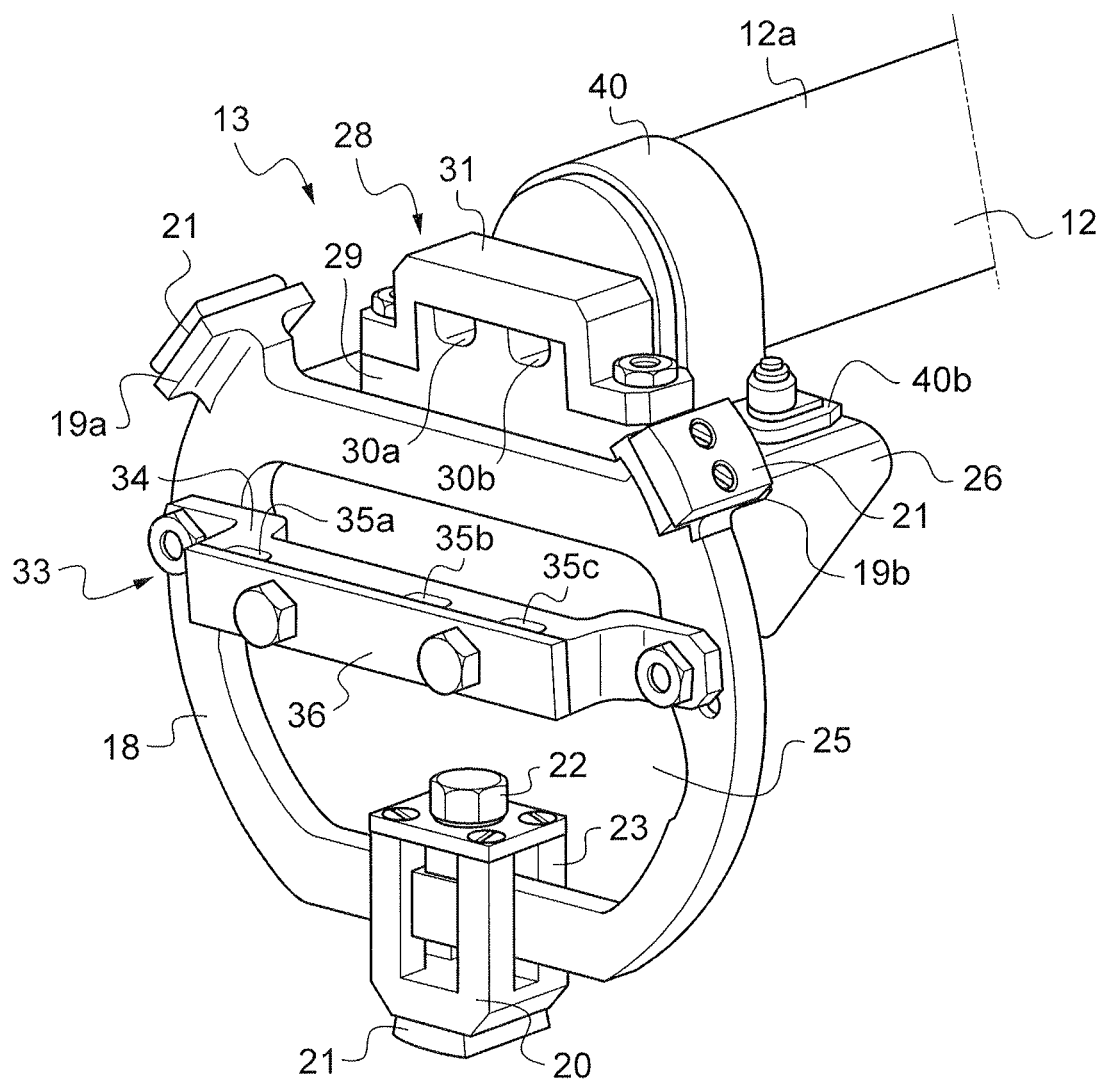

US 9,488,306 B2

DEVICE FOR GUIDING AND HOLDING A CABLE WITHIN A PIPE

CROSS REFERENCE TO RELATED APPLICATIONS

This application is a National Stage of International Application No. PCT/EP2011/072976 filed Dec. 15, 2011, claiming priority based on French Patent Application No. 10 60665 filed Dec. 16, 2010, the contents of all of which are incorporated herein by reference in their entirety.

The invention relates to a device for guiding and holding a cable in a duct, and more particularly for passing and fastening cables in landing gear.

BACKGROUND OF THE INVENTION

An undercarriage comprises a strut hinged at a top end to an aircraft and a rocker pivotally mounted to a bottom end of the strut. The rocker has at least one axle around which wheels are mounted to rotate together with speed sensors (tachometers) for measuring the speeds of rotation of the wheels. The speed sensors are arranged inside the axle and as close as possible to the wheels. Information from the speed sensors is conveyed to a braking control member, thereby enabling it to verify that braking is effective.

The braking control member and the speed sensors are electrically connected together by electric cables that run from the aircraft to the sensors by passing via the strut and then the rocker and finally inside the axle.

The electric cables are fastened to the strut by collars or supports that are fastened on the outside of the strut. Nevertheless, it is difficult to fasten the electric cables to the outside of the rocker and then insert those cables into the axle. The rocker is a part that is complex in shape and it is difficult to fasten collars thereon.

Thus, the electric cables are laid via the inside of the rocker so as to protect them and bring them by the shortest possible path to the speed sensors arranged in the axle. It is possible to lay cables in this way since the parts are generally hollow in order to be as light as possible.

Nevertheless, it is particularly difficult to fasten supports or cable collars inside hollow parts. It is difficult to drill and tap holes inside a part, and in any event that weakens the part.

As a result it is particularly troublesome to install and fasten cables inside a hollow part.

The invention thus proposes a simple device for installing a cable in a cylindrical member in order to fasten it therein without damaging or weakening said member.

BRIEF SUMMARY OF THE INVENTION

The invention provides a device for guiding a cable in a duct, the device being characterized in that it comprises at least one guide tube receiving the cable and at least one expandable clamp secured to one end of the tube, the expandable clamp being deployed so as to be blocked against the inside wall of the duct in order to hold the tube in the duct.

The expandable clamp enables a guide tube to be fastened inside the duct, which tube receives the cable without damaging the duct.

The invention also provides a method of guiding and holding a cable in a duct, the duct having an entry and an outlet orifice for the cable. The method comprises the steps of:

inserting a tube in the duct in such a manner that an upstream end of the tube is arranged at the entry of the duct and a downstream end is arranged facing the outlet orifice;
inserting an expandable clamp in the duct and securing it to the tube;
causing the clamp to expand so as to block it against the inside wall of the duct in order to hold the tube in the duct;
inserting the cable in the tube; and
blocking the cable on the device.

BRIEF DESCRIPTION OF THE DRAWINGS

Reference is made to the accompanying drawings, in which:

FIG. 3 is a perspective view of the upstream portion of the device of the invention.

DETAILED DESCRIPTION OF THE INVENTION

Figure 1:
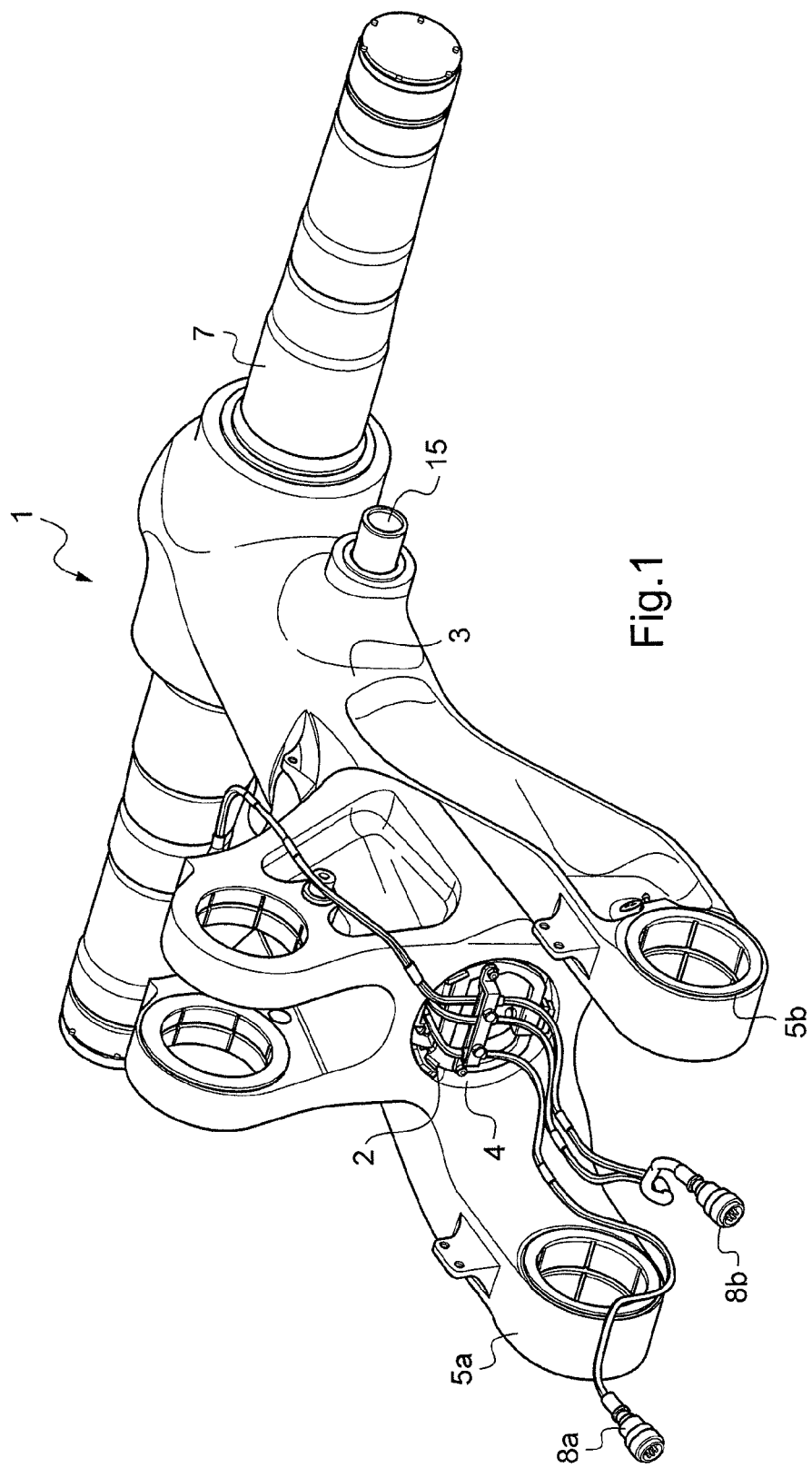
FIG. 1 is a perspective view of a rocker including a device of the invention.

With reference to FIG. 1, which shows a rocker 1 including a device 2 of the invention, the landing gear rocker 1 comprises a body 3 hollowed out by a cavity forming a substantially cylindrical duct 4 that extends inside the body 3 along its entire length. An upstream portion of the device 2 is arranged at the entry of the duct, with the duct being circular in section in this example.

The body 3 is extended at a proximal end by two lateral arms 5a and 5b forming lugs and serving to hinge the rocker 1 to a landing gear strut. In order to support the wheels, the rocker 1 has bearings at a distal end of the body 3, the bearings receiving a hollow axle 7 that in turn receives tachometers at its ends. The body 3 of the rocker 1 also has two arms 8a and 8b forming lugs for receiving in hinged manner the end of a shock absorber (not shown) that is connected to the strut.

Cables 8a, 8b coming from the braking control member are inserted into the duct 4 in order to be connected to the tachometers arranged in the axle 7.

Figure 2:
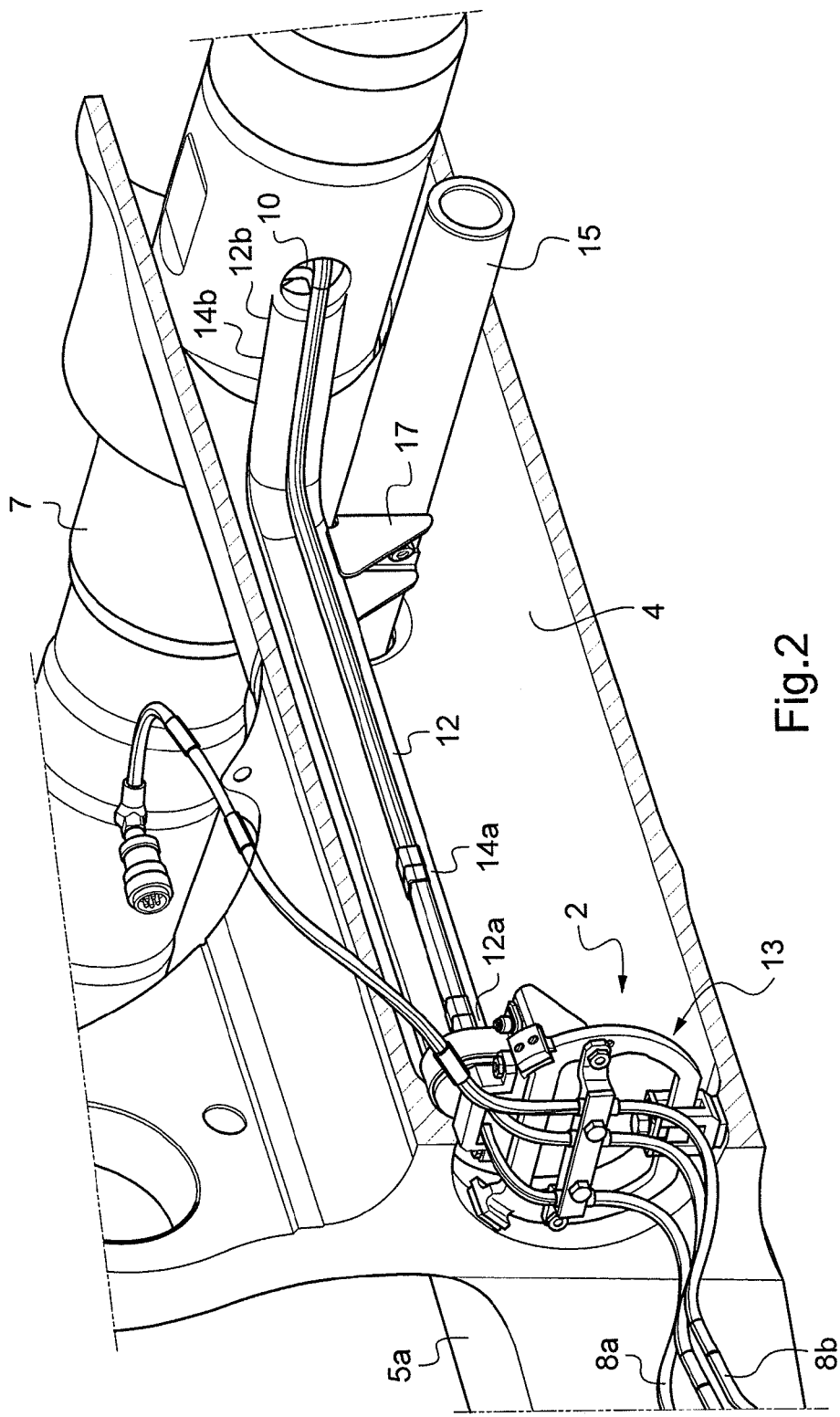
FIG. 2 is a section view in perspective of the rocker shown in FIG. 1, showing the device of the invention.

For this purpose, the axle 7 has an orifice 10 that is visible in FIG. 2 and that provides communication between the duct 4 and the inside of the axle 7 so that it is possible for the cables 8a, 8b to pass directly from the inside of the body 3 of the rocker 1 to the inside of the axle 7.

In the invention, the rocker 1 has a device 2 for guiding the cables 8a, 8b and arranged inside the duct 4, this device 2 serving to guide the cables 8a, 8b from the entry of the duct to the orifice 10 and to hold them securely inside the duct 4.

FIG. 2 shows the device 2 of the invention arranged inside the duct 4. The device comprises a guide tube 12 having a first end 12a arranged at the entry of the duct and having a second end 12b arranged facing the orifice 10. At a first fastener point, the guide tube 12 is fastened to the inside of the duct 4 by means of an expandable clamp 13 that is secured to the first end 12a of the tube.

The expandable clamp 13, shown more clearly in FIG. 3, comprises a frame 18 having two stationary pads 19a, 19b and one movable pad 20 fastened thereto. Each pad 19a, 19b, 20 has a bearing sole 21 made of elastomer enabling the clamp 13 to bear against the inside wall of the duct 4. The movable pad 20 has a screw 22 engaged in tapping formed in the frame 18 and a slide 23 slidably mounted on the frame so that turning the screw 22 moves the slide 23 towards the outside of the frame 18. Thus, once the expandable clamp 13 has been placed in the duct 4, perpendicularly thereto, it suffices to turn the screw 22 to cause the movable pad 20 to move until it comes into contact with the inside wall of the duct 4 and exerts a force against it. The stationary pads 19a, 19b are then pressed against the inside wall, thereby blocking the expandable clamp 13 in the duct 4.

The three pads 19a, 19b, and 21 are arranged on the frame 18 so as to form a Y-configuration.

The frame also has a central opening 25 that makes it possible, once the clamp 13 has been deployed inside the duct 4, to access the inside of the duct 4 via the entry of the duct 4, and also to turn the screw 22.

The expandable clamp 13 also has a plate 26 fastened to the frame 18 and facing towards the inside of the duct 4. The guide tube 12 is fastened to the plate 26 by means of an Ω-clamp 40 so as to secure the guide tube 12 to the expandable clamp 13. The Ω-clamp 40 comprises a strap that passes around the outside wall of the tube together with two tabs 40a and 40b that are fastened to the plate 26 by screws.

The expandable clamp 13 also has means for holding the cables in place relative to the device.

First blocking means 28 are arranged on the plate, in front of the second end 12a of the guide tube 12. These first blocking means 28 comprise a stand 29 having two notches 30a and 30b formed therein, together with a bridge 31 covering the stand 29 so as to press down on the cables arranged in the notches 30a, 30b. The stand 29 and the bridge 31 are then screwed together and to the plate 26 so as to block the cables 8a, 8b relative to the guide tube 12.

Second cable blocking means 33 are arranged on the frame 18. In similar manner to the first blocking means 28, the second means 33 comprise a fastener bar 34 having three notches 35a, 35b, and 35c formed therein and a plate 36 covering the bar 34 so as to press down on the cables 8a, 8b arranged in the notches 35a, 35b.

An example of cables blocked by the blocking means is shown in FIGS. 1 and 2.

The duct 4 has a catch 15 passing laterally therethrough parallel to the axle 7 and serving to prevent rotation of a member for braking the wheels (not shown). The catch 15 is an obstacle for passing the cables 8a, 8b in the duct. In an embodiment of the invention, the guide tube 12 is arranged to enable the cables 8a, 8b to avoid the catch 15.

The guide tube 12 thus comprises an upstream first portion 14a, i.e. close to the entry to the duct 4, that is straight, and a downstream second portion 14b that has a bend around the catch 15. The upstream portion of the tube is arranged as close as possible to the inside wall of the duct 4, and the downstream portion points so as to bring the second end of the tube 12b so that it faces the orifice 10.

The guide tube 12 also has a support 17 that is screwed onto the catch 15 in order to provide a second fastening point for the guide tube 12.

The cables 8a, 8b are laid and the device 2 is positioned in the duct 4 as follows.

The expandable clamp 13, without the second blocking means 33 is assembled with the guide tube 12 by screw fastening so as to form the device 2. The device is then inserted into the duct 4, with the expandable clamp 18 taking up its position in the entry to the duct 4. The opening in the frame 25 of the expandable clamp makes it possible to insert a hand or tools into the duct 4 in order to screw the support 17 for the guide tube 12 onto the catch 15. The position of the tube 12 as close as possible to the inside wall of the duct 4 also serves to provide better access to the support 17 and to the catch 15.

Naturally, it is also possible to fasten the tube 12 in the duct and then fit the expandable clamp 18 in the duct 4 prior to fastening it to the tube 12.

Once the support 17 has been screwed to the catch 15, the movable pad 20 of the expandable clamp 18 is moved so as to block the clamp 18 against the inside walls of the duct 4.

When the guide tube 12 is in position, the cables 8a, 8b are inserted into the tube 12 which then guides them up to the orifice 10.

The cables 8a, 8b are then blocked in the first blocking means 28. The second blocking means 33 are then fastened to the frame 18 of the expandable clamp 13 so as to block the cables 8a, 8b.

The presence on the expandable clamp 13 of two blocking means 28 and 33 makes it possible to lay the cable with a loop so as to avoid too much tension in the cables during movements of the rocker 1. Each cable 8a, 8b thus forms a loop between the two blocking means 28, 33.

Naturally, implementation of the invention is not limited to the above-described embodiment.

In particular, the device 2 may have more than one expandable clamp 13. In the above-described embodiment, the tube 12 is fastened to the catch 15. It is naturally possible to replace that second fastener point with an expandable clamp 13.

The expandable clamp may include other blocking means in the duct that are not restricted to the example described. The blocking means comprise pads having springs for exerting a force on the inside wall of the duct or pads mounted on wedge-shaped spacers, . . . .

The expandable clamp 13 and in particular the frame 18 and the pads 19a, 19b, 20 may be adapted to the section of the duct 4. For example, for a duct of elliptical section, the frame 18 should be substantially elliptical and the clamp 13 should have four pads in a right-angled distribution in order to ensure that the clamp 13 is stable in the duct 4.

Furthermore, the pads 19a, 19b, and 20 may include soles 21 that are rigid so as to withstand wear. Nevertheless, it should be observed that one of the looked-for objectives of the invention is to avoid damaging the body 3 of the rocker 1, so the soles should be selected to avoid scratching the inside wall of the duct 4.

The device described is particularly suitable for a landing gear rocker 1. Naturally, the device 2 may be adapted to any hollow member that requires a cable to be passed therealong between an entry and an outlet orifice.

The invention claimed is:

1. A device (2) for guiding a cable (8a, 8b) in a duct (4), the device (2) comprising:
    at least one guide tube (12) adapted to receive the cable (8a, 8b), and
    at least one expandable clamp (13) attached to one end (12a) of the guide tube (12), the at least one expandable clamp (13) being adapted to be deployed so as to be blocked against an inside wall of the duct (4) in order to hold the guide tube (12) in the duct (4),
    wherein the at least one expandable clamp (13) comprises a rigid frame (18) on which is attached the guide tube (12), and at least one pad (20) that is fastened on the rigid frame (18), at least one of said at least one pad is a movable pad (20) which is arranged on the rigid frame (18) so as to be movable relative to the rigid frame (18) and so as to exert a force on the inside wall of the duct (4), wherein the guide tube (12), the rigid frame (18) and the movable pad (20) are mechanical parts which are assembled together to form the at least one expandable clamp (13), wherein the rigid frame (18) has a closed shape that delimits a surrounded space forming a central opening (25) of the rigid frame, and wherein the guide tube (12) is attached to the rigid frame (18) so as to be arranged substantially against the inside wall of the duct (4) and so that the device (2) allows access of a hand to the inside of the duct (4) through said central opening (25).

2. The device according to claim 1 wherein each one of said at least one pad (20) has a sole (21) made of elastomer and is adapted to bear against the inside wall of the duct (4).

3. The device according to claim 1, wherein the expandable clamp (13) includes blocking means (28, 33) for blocking the cable (8a, 8b) relative to the guide tube (12).

4. An aircraft landing gear including a duct (4) and a device according to claim 1, wherein the clamp (13) is expanded so as to be blocked against the inside wall of the duct (4).

5. A method of guiding a cable (8a, 8b) in a duct (4) having an entry and an outlet orifice (10) for the cable, the method comprising the steps of:

inserting a guide tube (12) in the duct (4) in such a manner that an upstream end of the guide tube (12a) is arranged at the entry of the duct (4) and a downstream end (12b) is arranged facing the outlet orifice (10);

inserting in the duct (4) an expandable clamp (13) which comprises a rigid frame (18) and at least one movable pad (20), the rigid frame having a closed shape that delimits a surrounded space forming a central opening (25) of the rigid frame and said at least one movable pad (20) being arranged on the rigid frame (18) so as to be moveable relative to the rigid frame (18) in order to expand the clamp (13);

attaching the guide tube (12) to the rigid frame 18) of the expandable clamp (13) in such a way to allow access of a hand to the inside of the duct (4) through the central opening (25);

moving said at least one movable pad (20) relative to the rigid frame (18) so as to expand the clamp (13) and block it against an inside wall of the duct (4) in order to hold the guide tube (12) in the duct (4);

inserting the cable (8a, 8b) in the guide tube (12); and blocking the cable (8a, 8b) on the device with the help of blocking means (28, 33).

\* \* \* \* \*